July 13, 1948.  H. L. BAKER  2,445,054
VULCANIZER

Filed May 14, 1945  4 Sheets-Sheet 1

INVENTOR.
HAROLD L. BAKER
BY
Boyken, Mohler & Beckley
ATTORNEYS

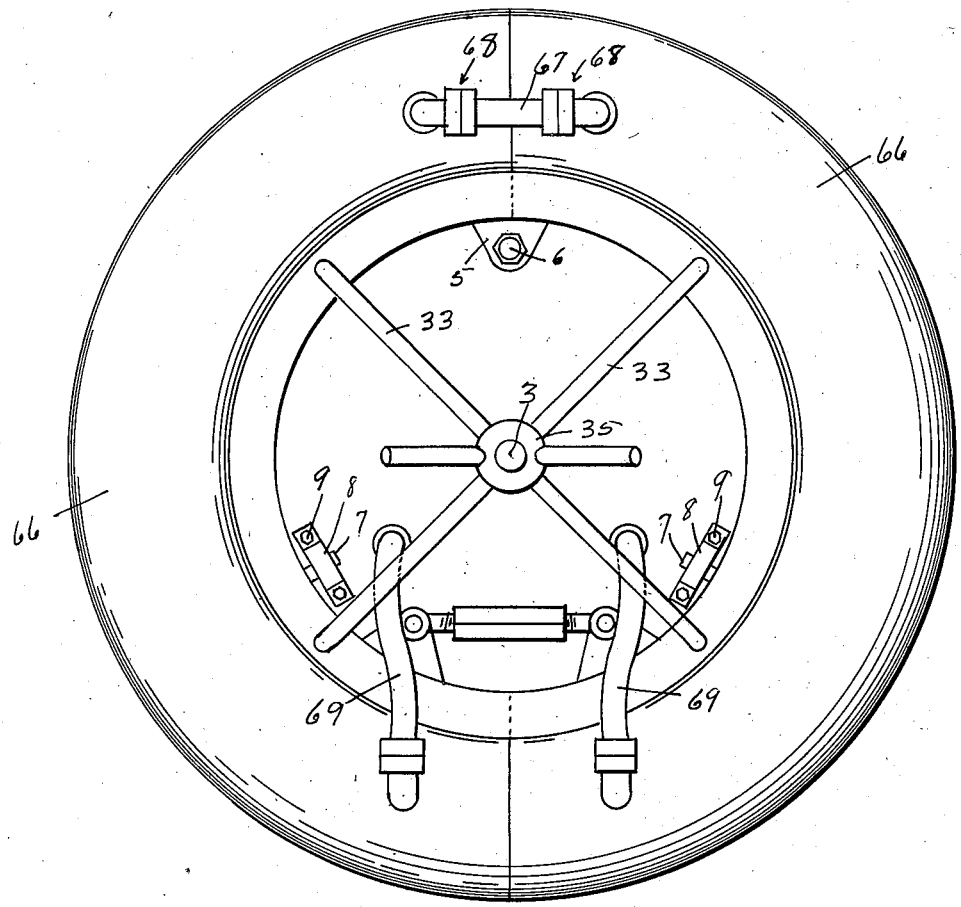
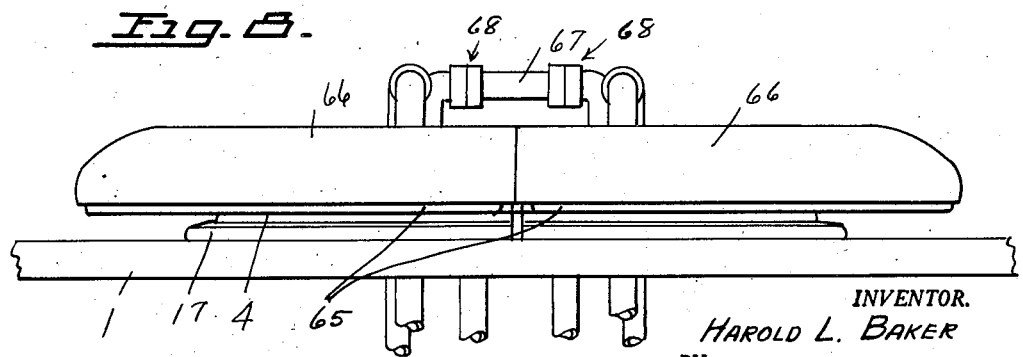

July 13, 1948.  H. L. BAKER  2,445,054
VULCANIZER
Filed May 14, 1945  4 Sheets-Sheet 3
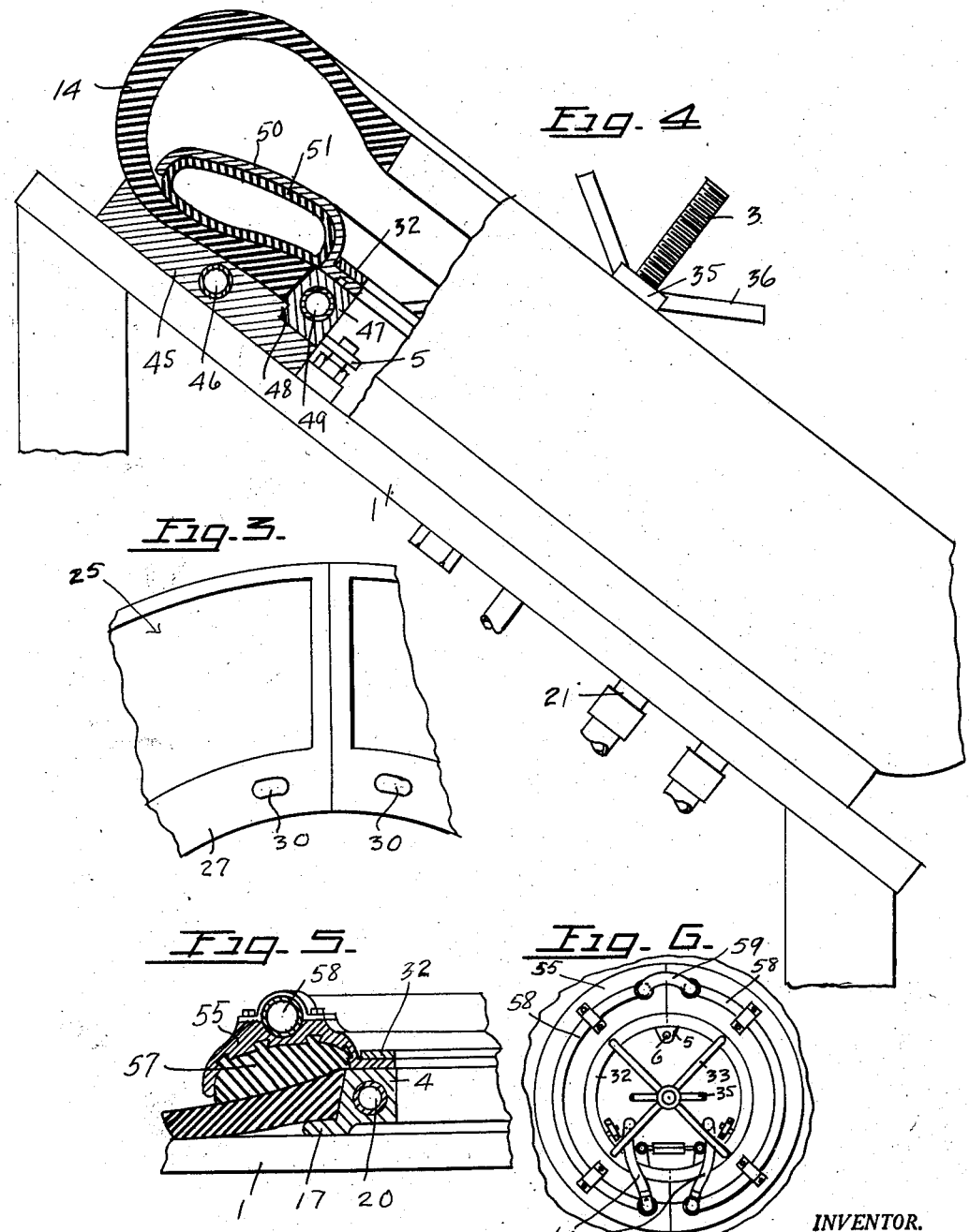
INVENTOR.
HAROLD L. BAKER
BY
Boyken, Mohler & Beckley
ATTORNEYS.

July 13, 1948.  H. L. BAKER  2,445,054
VULCANIZER

Filed May 14, 1945  4 Sheets-Sheet 4

INVENTOR.
HAROLD L. BAKER
BY
Boyken, Mohler & Beckley
ATTORNEYS.

Patented July 13, 1948

2,445,054

UNITED STATES PATENT OFFICE 2,445,054

VULCANIZER

Harold L. Baker, Clovis, Calif.

Application May 14, 1945, Serial No. 593,644

14 Claims. (Cl. 18—18)

This invention relates to a vulcanizer for tire casings, and particularly to a vulcanizer for use in making bead-and-side wall repairs.

Tire casings for airplanes, automobiles and other vehicles made by different manufacturers, although of purportedly the same size, have appreciable variations, particularly with respect to their bead dimensions. The inside bead diameter (taken across the central axis of the tire) varies so greatly with different tires that the protective bead covering strips are frequently injured and torn in removing some casings from rims or in removing them from the vulcanizers themselves in the process of manufacture or in the process of making repairs.

Attempts to repair such injuries have been attempted by use of spot vulcanizers, each of which is adapted to merely repair a localized point on the axially outwardly facing side of each bead portion and not the radially facing side. This radially inwardly facing side has perhaps the most frequent injury. Also such prior devices are not well adapted to making repairs over a portion of the bead that has been kinked or permanently distorted by use of a tire iron in removing the casing from a rim inasmuch as sandbags used against the inner side of such portion do not evenly distribute the pressure over both the kink and the portion at the opposite sides of the same, hence the resultant vulcanization varies.

One of the objects of the present invention is the provision of means for quickly and efficiently effecting bead repairs at one time for substantially any desired length of each bead portion, and which means is adapted for use on tires of variable actual bead dimensions without difficulty in removing the device from the casing and without causing injury to the bead portion or casing in the removal of the tire from the device for a bead repair.

Another object of the invention is the provision of a device for making tire repairs that is adapted to do a proper vulcanizing job on the rim engaging surfaces of either of the bead portions of tire casings as well as doing a proper vulcanizing job on the axially facing sides of such portions and well up on the side walls to the shoulders without requiring the conventional air or steam bag filling the interior of the casing, but with a fluid pressure bag localized along one or the other of the inner sides of the casing as may be required.

A still further object of the invention is the provision of vulcanizing means for making a proper vulcanizing job on a kinked or distorted bead portion of a casing as well as the bead portions adjacent such distorted portion.

Other objects and advantages will appear in the description and in the claims.

In the drawings,

Fig. 3 is a fragmentary lower plan view of a portion of the bag receiving elements of Figs. 1, 2.

Fig. 4 is a modified form of the invention shown in Figs. 1, 2 partly in section, but with the table indicated in its proper inclined position.

Fig. 5 is a fragmentary sectional view of a still further modified form of the invention.

Fig. 6 is a reduced plan view of the device of which Fig. 5 is merely a fragment.

Fig. 7 is a plan view of another modification of the device of Figs. 1, 2 in which means is provided for supplying steam to the air bag.

Fig. 8 is an elevational view of the device of Fig. 7 in assembled position without a tire casing and tightening screw and post of Fig. 7.

Figure 1:
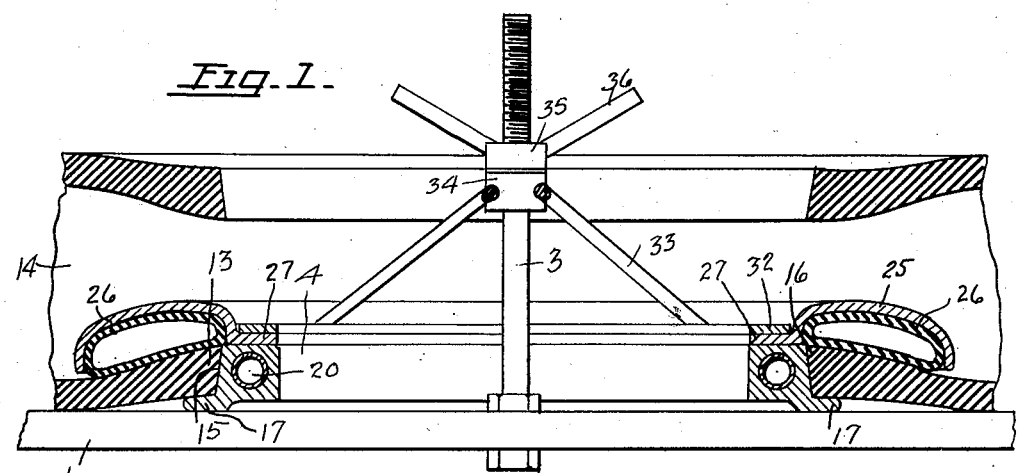
Fig. 1 is a sectional view through a vulcanizer illustrating one form of the invention, part of the tire casing being indicated in section.
Figure 2:
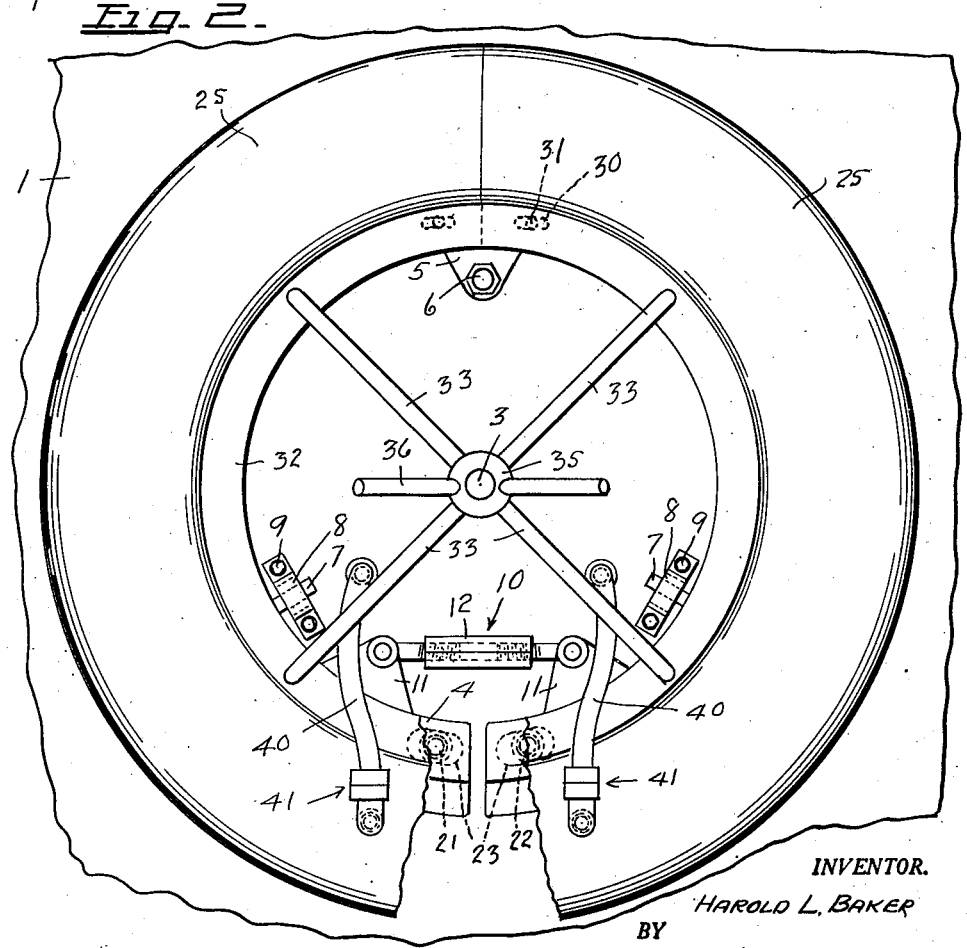
Fig. 2 is a plan view of the device of Fig. 1, part of the table being broken away and the tire casing being omitted.

In detail, referring to Figs. 1, 2 the device comprises a table 1 inclined at an angle with a central screw post 3 projecting upwardly therefrom at right angles thereto.

On this table a transversely split ring 4 is positioned coaxial with said post 3 with the split in the ring on the table. The ring has an apertured lug 5 projecting radially inwardly from the side of the ring that is opposite the split and the table carries a bolt 6 adapted to pass through the aperture in such lug. Radially inwardly extending projections 7 on said ring equally spaced from lug 5 and at opposite sides of the split in the ring are adapted to be held below inverted U-shaped clamp members 8 that are adapted to be releasably secured to the table by bolts or screws 9. The bolt 6 and members 8 hold ring 4 on the table substantially coaxial with the post 3 although play is permitted by the clamp member 8 for spreading of the ring.

A turnbuckle device 10 is pivotally secured at its ends to lugs 11 that are in turn secured to ring 4 at opposite sides of the split. Upon turning the connection 12 of the turnbuckle in one direction or the other the ends of the ring 4 will be contracted or expanded. Ring 4 is resilient and tends to return to contracted position at all times, hence it will not be under tension when not in use. The expansion of the ring against the resiliency of the material will cause substantially uniform pressure against one of the radially inwardly facing bead portions 13 of a tire 14 while contraction of the ring will draw the ring away from the bead portion in a radial direction.

The entire peripheral surface 15 of said ring is formed to fit against the radially inwardly facing surface of either bead portion of a tire when the ring is expanded and the toe 16 of said bead portion preferably terminates about flush with the upper side of ring 4 (Fig. 1) while a flange 17 (preferably integral with ring 4 although it may be in the form of a separate plate in a modified form as will later be explained) extends over the axially outwardly facing side of the bead portion and conforms in cross sectional contour to the surface of said side.

The ring 4 is provided with a steam chamber 20 extending substantially from end to end thereof and steam inlet and outlet pipes 21, 22 (Fig. 2) may extend through slots 23 in table 1 to below the latter.

When a tire casing such as casing 14 is positioned on its side on table 1 concentric with post 3, its lower bead portion will be readily engaged by the peripheral surface 15 of ring 4 when the ring is expanded by rotation of connection 12. However, to effect a proper bead repair pressure must be exerted against the axially inwardly facing side of the bead portion that is engaged by the ring 4. This means comprises a pair of arcuately extending members 25 which can be slipped through the central opening in the tire from the upper side thereof and between the beads to join at their ends in forming an annular device overlying said axially inwardly facing surface. The portion of each member 25 so overlying said surface is formed with an axially downwardly opening channel in which an air bag 26 may fit and be secured.

Each bag 26 extends arcuately to the ends of the channel in each member and projects from the open side of each member to not only lie over the axially inwardly facing side of the bead portion that is engaged by ring 4 and in engagement with such side but each bag extends very slightly over the ring adjacent the toe of the bead portion 13. (Fig. 1.)

Adjacent the inner side of the channel portion of each member 25 is a flat, arcuately extending flange 27 that is adapted to lie over and against the upper flat side of ring 4. The said channel portion preferably extends somewhat slantingly from the flange 27 so as to make the air bag generally follow the cross sectional contour of the inner surface of the bead portion (Fig. 1).

Each flange 27 is formed on its side adjacent ring 4 and at the side of said ring opposite the split in the latter with a recess 30 (Fig. 3) for respectively receiving dowel pins 31 (Fig. 2) projecting from the upper side of said ring. These recesses are elongated so as not to interfere with expansion and contraction of ring 4.

After the members 25 are in proper position a clamping ring 32 of a diameter to pass through the central opening in tire 14 is positioned over flange 27. This ring 32 carries upwardly converging arms 33 that connect at their upper ends with a sleeve 34 that is apertured to pass the post 3. A nut 35 having turning arms 36 thereon may then be screwed onto post above sleeve 34 and when tightened against sleeve 34 the ring 32 will be tightly drawn against the flanges 27, thus holding the ring 4 and flanges 27 tightly between table 1 and the clamping ring 32.

Flexible air pressure lines 40 that are connected with pressure lines extending through the table are connected with inlets in each air bag by any conventional quick detachable couplings 41 and the tire is ready for vulcanizing after air is admitted into the bags, or stream, the latter being most commonly used.

By the above means a uniform desired pressure is maintained on the bead portion irrespective of kinks in the bead and an entire bead repair job is quickly made on any portion thereof. The open end of ring 4 may be at whatever point on the bead where there is no necessity for a repair inasmuch as every tire has such point.

In those instances where a side wall repair is desirable the flange 17 of the ring 4 may be substituted by an annular plate 45 (Fig. 4) and which plate may be formed with a steam chamber 46. Corresponding to ring 4 of Fig. 1 is a split ring 47 that may be rabbeted along one edge to fit over a shoulder 48 on said plate. Thus ring 47 has a steam chamber 49 and is expanded and contracted by the same means as is shown for the ring of Figs. 1, 2.

The members 25 in Figs. 1, 2 do not extend into the tire far enough to do a side wall repair job so the members 50 in Fig. 4 are wider as are air bags 51 so as to extend the desired distance across said side walls, otherwise the clamping means and flanges on said members 50 are identical with the flanges and clamping means of Figs. 1, 2 and are numbered the same as in said figures.

There are also instances in which air or steam bags are not available or where their cost is out of proportion to the work done and in Figs. 5, 6 are shown a modification of the devices of Figs. 1, 2 that will do a creditable job. In this device the elements that are identical with those of Figs. 1, 2 are numbered like the corresponding elements in said figures such as the clamping means and split bead engaging ring 4.

The members 55 in Figs. 5, 6 are substituted for members 25 of Figs. 1, 2 and said members 55 carry yieldable rubber 57 instead of air bags while they also carry steam pipes 58 for supplying a certain amount of heat to the bead portion in addition to the heat supplied by the ring 4. These pipes 58 may be coupled together at their ends opposite the split in ring 4 by a flexible coupling 59 and instead of the two air inlets of Fig. 1 one pipe is a steam inlet and the other is a steam outlet respectively connected by flexible steam lines 60 to the inlet and outlet ends of the conduit formed by pipes 58 and coupling 59.

Figure 9:
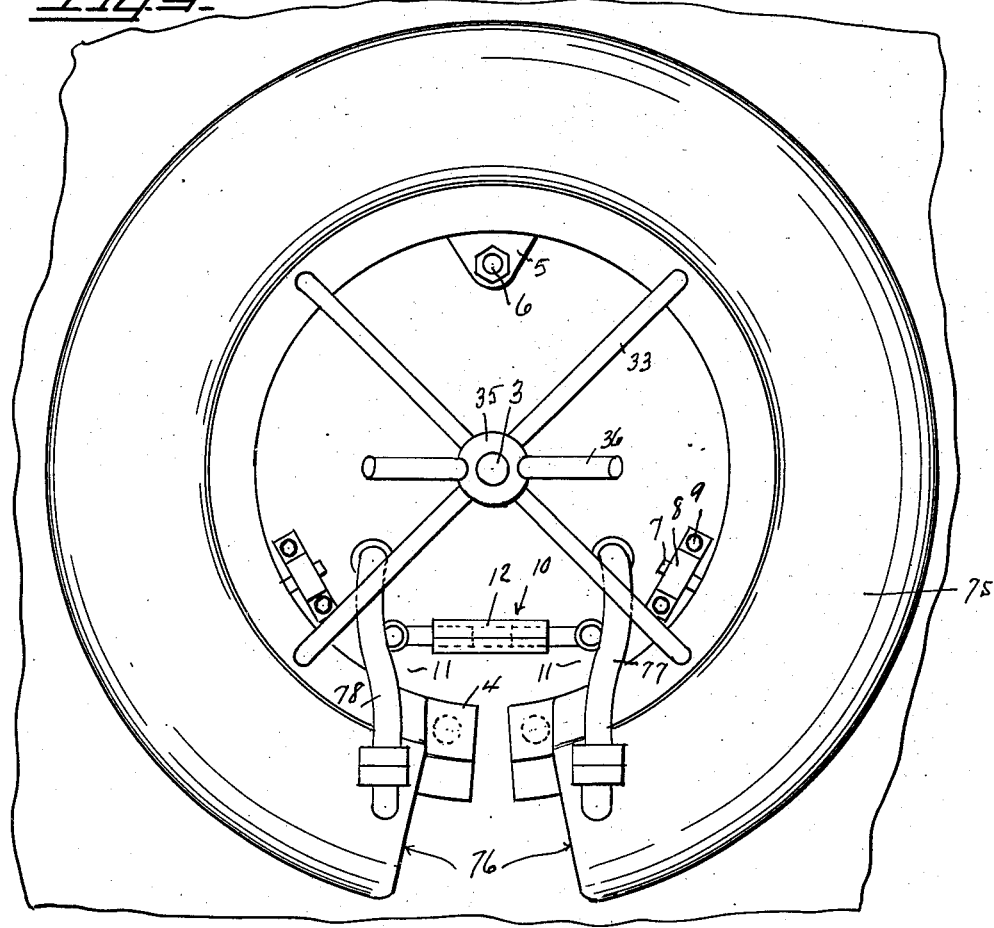
Fig. 9 is a plan view of a modification of the device of Figs. 7, 8 in which the steam bag is in one piece.
Figure 10:
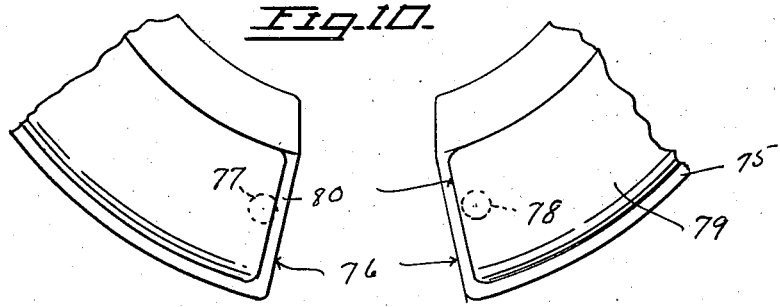
Fig. 10 is a fragmentary elevational view of the ends of the steam bag in the support therefor.

Much the same arrangement as shown in Figs. 5, 6 may be used for supplying heat to the axially inner side of a bead portion through the use of steam bags 65 (Fig. 8) in members 66 that are identical with the members 25 of Figs. 1, 2 except that a flexible coupling hose 67 (Figs. 7, 8) connects each of the bags at the ends of said members that are opposite the split in ring 4. The same steam pipes 60 of Fig. 6 may be employed to provide steam for said bags, and the flexible hose 67 is detachable from the members 66 by quick detachable means 68 similar to couplings 41 of Fig. 2. Also steam lines 69 may connect the bags with an inlet and exhaust respectively for circulating the steam through the bags for maintaining the desired vulcanizing temperature.

Where an inside cure is desired, the device of Figs. 9, 10 is ordinarily the preferred construction. In this device the ring 4 is identical with that of Fig. 1 as shown in Fig. 9 although it is obvious that if a more extended side wall repair is desired, the ring 47 and side wall plate 45 of Fig. 4 may be employed.

In Figs. 9, 10 instead of using two members such as members 66 of Figs. 7, 8 for the steam bags, only one member 75 is used and this member is almost completely annular but has a section of say from three to six inches removed at one side as at 76 to permit insertion of the member 75 into the casing.

A steam inlet 77 and outlet 78 is provided at opposite ends of bag 79, said bag being in one piece and filling the channel in number 75. End walls 80 are at the ends of the channel in which the bag fits (Fig. 10).

As already mentioned, in a tire casing that is capable of being repaired there is always a section of at least six inches that does not require vulcanizing; therefore the gap 76 in the member 75 is placed at this point and the bag 79 will cover the remainder of the circumference over which it lies.

I claim:

1. A vulcanizer of the character described comprising a transversely split radially expansible ring formed with a radially outwardly facing surface adapted to extend completely across and to fit against the radially inwardly facing surface of a bead portion of a tire casing; annular yieldable pressure means adapted to fit against the inner axially facing side of said bead portion; a channel member into which said pressure means extends; a plate adapted to fit against the outer axially facing side of said bead portion, means positioned wholly within the diameter of said bead portion for releasably clamping said ring channel member, pressure means, and plate in assembled relation with such bead portion between said pressure means and said plate and against said ring, and means for heating said ring and said plate.

2. A vulcanizer of the character described comprising a transversely split radially expansible ring formed with a radially outwardly facing surface adapted to extend completely across and to fit against the radially inwardly facing surface of a bead portion of a tire casing; annular yieldable pressure means adapted to fit against the inner axially facing side of said bead portion, a channel member into which said pressure means extends; a plate adapted to fit against the outer axially facing side of said bead portion, means positioned wholly within the diameter of said bead portion for releasably clamping said ring channel member, pressure means, and plate in assembled relation with such bead portion between said pressure means and said plate and against said ring, and means for heating said ring and said plate; said pressure means being divided transversely into a plurality of sections.

3. A vulcanizer of the character described comprising a transversely split ring formed with a radially outwardly facing surface adapted to fit against the radially inwardly facing surface of a bead portion of a tire casing; annular yieldable pressure means adapted to fit against the inner axially facing side of said bead portion, a plate adapted to fit against the outer axially facing side of said bead portion, means for releasably clamping said ring, pressure means, and plate in assembled relation with such bead portion between said pressure means and said plate and against said ring, and means for heating said ring and said plate; said ring being resilient, and means for spreading and for contracting the same to respectively tighten and loosen the same relative to said bead portion.

4. A vulcanizer of the character described comprising a transversely split ring formed with a radially outwardly facing surface adapted to fit against the radially inwardly facing surface of a bead portion of a tire casing; annular yieldable pressure means adapted to fit against the inner axially facing side of said bead portion, a plate adapted to fit against the outer axially facing side of said bead portion, means for releasably clamping said ring, pressure means, and plate in assembled relation with such bead portion between said pressure means and said plate and against said ring, and means for heating said ring and said plate the circumference of the surface of said ring that is adapted to engage said surface of bead portion being less than the circumference of said latter surface, and means carried by said ring for spreading the same so that the surfaces to be engaged will be tightly together.

5. A vulcanizer of the character described comprising a transversely split ring formed with a radially outwardly facing surface adapted to fit against the radially inwardly facing surface of a bead portion of a tire casing; annular yieldable pressure means adapted to fit against the inner axially facing side of said bead portion, a channel member into which said pressure means extends, a plate adapted to fit against the outer axially facing side of said bead portion, means including a ring disposed wholly within the diameter of such bead portion for releasably clamping said ring channel member, pressure means, and plate in assembled relation with such bead portion between said pressure means and said plate and against said ring, and means for heating said ring and said plate; said plate being integral with said ring.

6. A vulcanizer of the character described comprising a transversely split ring formed with a radially outwardly facing surface adapted to fit against the radially inwardly facing surface of a bead portion of a tire casing, annular yieldable pressure means adapted to fit against the inner axially facing side of said bead portion, a plate adapted to fit against the outer axially facing side of said bead portion, means including a ring disposed wholly within the diameter of such bead portion for releasably clamping said first mentioned ring, pressure means, and plate in assembled relation with such bead portion between said pressure means and said plate and against said ring, and means for heating said ring and said plate, said pressure means including a fluid expansible flexible receptacle adapted to be filled with fluid under pressure for expanding the same against said axially inwardly facing surface of such bead portion and a rigid retainer for holding the said receptacle in position.

7. A vulcanizer of the character described comprising a transversely split ring having a steam chamber therein extending circumferentially thereof with an inlet and outlet at opposite sides of the split, the outer peripheral surface of said ring including a portion adapted to fit against the radially inwardly facing surface of a bead portion of a tire casing, said ring being resilient for expanding and contracting the same for moving said peripheral surface into and out of tight engagement with said bead portion, yieldable fluid expansible means formed to fit against the axially inwardly facing surface of such bead portion and to extend to the radially inwardly facing surface of said portion, and means for admitting fluid under pressure into said expansible means, and clamping means for holding said expansible means tightly against said inwardly facing surface when said ring is in engagement with said bead portion, said clamping means including a table adapted to support said ring and said bead portion thereon, annular means overlying said ring and said expansible means, and a screw for drawing said annular means and said table toward each other with said bead portion between said table and said expansible means.

8. A vulcanizer of the character described comprising a transversely split ring having a steam chamber therein extending circumferentially thereof with an inlet and outlet at opposite sides of the split, the outer peripheral surface of said ring including a portion adapted to fit against the radially inwardly facing surface of a bead portion of a tire casing, said ring being resilient for expanding and contracting the same for moving said peripheral surface into and out of tight engagement with said bead portion, yieldable fluid expansible means formed to fit against the axially inwardly facing surface of such bead portion, and means for admitting fluid under pressure into said expansible means, and clamping means for holding said expansible means tightly against said inwardly facing surface when said ring is in engagement with said bead portion, said expansible means comprising a pair of arcuately extending cylindrical bags, and a pair of similarly arcuately extending channel members in which said bags are respectively positioned with one of the sides of each bag projecting therefrom for engagement with such bead portion and said clamping means including a support for said bead portion positioned at the side thereof opposite said expansible means.

9. A vulcanizer of the character described comprising a transversely split ring having a steam chamber therein extending circumferentially thereof with an inlet and outlet at opposite sides of the split, the outer peripheral surface of said ring including a portion adapted to fit against the radially inwardly facing surface of a bead portion of a tire casing, said ring being resilient for expanding and contracting the same for moving said peripheral surface into and out of tight engagement with said bead portion, yieldable fluid expansible means formed to fit against the axially inwardly facing surface of such bead portion, and means for admitting fluid under pressure into said expansible means, and clamping means for holding said expansible means tightly against said inwardly facing surface when said ring is in engagement with said bead portion, a turnbuckle connecting opposite ends of said ring for spreading the ring against its resiliency and said clamping means including a support for said bead portion positioned at the side thereof opposite said expansible means.

10. A vulcanizer of the character described comprising a table, a transversely split radially expansible ring formed with a radially outwardly facing surface adapted to fit against the radially inwardly facing surface of a bead portion of a tire casing and having a radially outwardly projecting flange adapted to extend over the axially outwardly facing surface of such portion, means for radially expanding and contracting said ring to respectively engage and disengage said bead portion, said flange being disposed against said table, from end to end thereof, said ring having an inlet and an outlet for steam, an arcuately extending member adapted to extend over and to circumferentially follow a portion of the inner axially facing side of such bead portion, an arcuately extending fluid pressure bag adapted to also follow said axially facing side of said portion and to be positioned between said member and such portion, clamping means for tightly clamping said ring, table and member together and means for admitting fluid under pressure into said bag.

11. A vulcanizer of the character described comprising a table, a transversely split radially expansible ring formed with a radially outwardly facing surface adapted to fit against the radially inwardly facing surface of a bead portion of a tire casing and having a radially outwardly projecting flange adapted to extend over the axially outwardly facing surface of such portion, means for radially expanding and contracting said ring to respectively engage and disengage said bead portion, said flange being disposed against said table, from end to end thereof, and having an inlet and an outlet for steam, an arcuately extending member adapted to extend over and to circumferentially follow a portion of the inner axially facing side of such bead portion, an arcuately extending fluid pressure bag adapted to also follow said axially facing side of said portion and to be positioned between said member and such portion, clamping means for tightly clamping said ring, table and member together and means for admitting fluid under pressure into said bag, said clamping means comprising an annular element adapted to overlie said ring with a portion of said member between it and said ring, and a screw connecting said element with said table for drawing the said element against said portion of said manner.

12. A vulcanizer of the character described comprising a table, a transversely split radially expansible ring formed with a radially outwardly facing surface adapted to fit against the radially inwardly facing surface of a bead portion of a tire casing and having a radially outwardly projecting flange adapted to extend over the axially outwardly facing surface of such portion, means for radially expanding and contracting said ring to respectively engage and disengage said bead portion, said flange being disposed against said table, from end to end thereof, and having an inlet and an outlet for steam, an arcuately extending member adapted to extend over and to circumferentially follow a portion of the inner axially facing side of such bead portion, an arcuately extending fluid pressure bag adapted to also follow said axially facing side of said portion and to be positioned between said member and such portion, clamping means for tightly clamping said ring, table and member together and means for admitting fluid under pressure into said bag, means for releasably securing said ring to said table during expansion and contraction thereof.

13. A vulcanizer of the character described comprising a table, a transversely split radially expansible ring formed with a radially outwardly facing surface adapted to fit against the radially inwardly facing surface of a bead portion of a tire casing and having a radially outwardly projecting flange adapted to extend over the axially outwardly facing surface of such portion, means for radially expanding and contracting said ring to respectively engage and disengage said bead portion, said flange being disposed against said table, from end to end thereof and having an inlet and an outlet for steam, an arcuately extending member adapted to extend over and to circumferentially follow a portion of the inner axially facing side of such bead portion, an arcuately extending fluid pressure bag adapted to also follow said axially facing side of said portion and to be positioned between said member and such portion, clamping means for tightly clamping said ring, table and member together and means for admitting fluid under pressure into said bag, said element being formed with a channel for receiving a side of said bag therein and the portion of said element adapted to be positioned between said clamping means and said rings projecting from one edge of said channel.

14. A vulcanizer of the character described comprising a table, a transversely split radially expansible ring formed with a radially outwardly facing surface adapted to fit against the radially inwardly facing surface of a bead portion of a tire casing and having a radially outwardly projecting flange adapted to extend over the axially outwardly facing surface of such portion, means for radially expanding and contracting said ring to respectively engage and disengage said bead portion, said flange being disposed against said table, from end to end thereof and having an inlet and an outlet for steam, an arcuately extending member adapted to extend over and to circumferentially follow a portion of the inner axially facing side of such bead portion, an arcuately extending fluid pressure bag adapted to also follow said axially facing side of said portion and to be positioned between said member and such portion, clamping means for tightly clamping said ring, table and member together and means for admitting fluid under pressure into said bag, a part of said bag being adapted to extend past the toe of said bead portion and over said ring.

HAROLD L. BAKER.

REFERENCES CITED

The following references are of record in the file of this patent:

UNITED STATES PATENTS

| Number | Name | Date |
| --- | --- | --- |
| 1,837,356 | Cartier | Dec. 22, 1931 |
| 1,975,038 | Glazner | Sept. 25, 1934 |
| 2,059,851 | Corbin | Nov. 3, 1936 |
| 2,158,703 | Kite | May 16, 1939 |
| 2,320,778 | Herman | June 1, 1943 |
| 2,370,655 | Glynn | Mar. 6, 1945 |

FOREIGN PATENTS

| Number | Country | Date |
| --- | --- | --- |
| 30,774/30 | Australia | Mar. 29, 1931 |
| 532,712 | France | Feb. 10, 1922 |